United States Patent [19]

Andersson

[11] Patent Number: 4,709,592
[45] Date of Patent: Dec. 1, 1987

[54] ADJUSTABLE STEERING WHEEL SHAFT FOR VEHICLES

[75] Inventor: Olle Andersson, Dalstorp, Sweden

[73] Assignee: Verkstads AB Claes Johansson, Dalstorp, Sweden

[21] Appl. No.: 837,250

[22] Filed: Mar. 7, 1986

[30] Foreign Application Priority Data

Mar. 7, 1985 [SE] Sweden ............................ 8501109

[51] Int. Cl.[4] .......................... B62D 1/18; G05G 5/16
[52] U.S. Cl. ...................................... 74/493; 74/531; 74/540
[58] Field of Search ..................... 74/493, 531, 540; 280/775

[56] References Cited

U.S. PATENT DOCUMENTS

| 2,903,904 | 9/1959 | Mackie | 74/493 |
| 3,285,090 | 11/1966 | Cranbury | 74/493 |
| 3,302,478 | 2/1967 | Pauwels | 74/493 |
| 4,407,166 | 10/1983 | Protz et al. | 74/493 |
| 4,539,861 | 9/1985 | Nishikawa | 74/493 |

FOREIGN PATENT DOCUMENTS

| 1814609 | 7/1969 | Fed. Rep. of Germany . |
| 422185 | 2/1982 | Sweden . |
| 8203018 | 6/1983 | Sweden . |

Primary Examiner—Allan D. Herrmann
Attorney, Agent, or Firm—Cushman, Darby & Cushman

[57] ABSTRACT

In a steering column, a mechanism for adjusting its length and inclination relative to the vehicle body, the steering column consisting of a steering column casing or housing, interconnecting first and second steering column tubes, the first tube being displaceable and the second pivotable relative to the housing, the second steering column tube end cooperating with the housing and having a hub limitably rotatable in a seat in the housing about an axle located perpendicular to the tube and adapted to be arrested in different angular positions by a locking mechanism, an angularly adjustable coupling interconnecting the steering gear post and the steering axle extending through the first and second steering column tubes in the housing, a common control for releasing or locking both adjustments of the steering column, a piston axially displaceable and/or pivotably supported in the housing, and biased to a position wherein it locks the first steering column tube against actual displacement and causes the blocking mechanism to prevent the hub from rotation, the piston by actuation of the control being displaceable and/or pivotable to a first position wherein it allows actual displacement and/or the release of the hub, thereby permitting rotation of the second steering column tube where further to a second position wherein also the other of these motions is permitted, thereby giving two distinct spaced apart release positions, one for a first such motion and another for both such motions.

10 Claims, 8 Drawing Figures

ADJUSTABLE STEERING WHEEL SHAFT FOR VEHICLES

The present invention relates to an adjustable steering wheel column for vehicles.

There is a desire to be able to adjust and position the steering wheel shaft of a steerable vehicle in such a way that the steering wheel fitted to the steering wheel column is situated in a position within easy and comfortable reach for the driver of the vehicle. This applies both to the first setting of the steering wheel column in a new vehicle and also to adjustment of the shaft when the vehicle shall be used by someone else.

In order to provide an adjustment mechanism which makes it possible for each user to achieve the individually best setting, it is necessary to be able to adjust the length of the steering wheel column as well as its angular inclination.

Steering wheel columns adjustable in this manner are known in many different embodiments, however they are often designed in a such manner that it is necessary to actuate two different adjustment mechanisms in order to bring about a correct adjustment.

There also has been developed adjustment mechanisms which from a single control can actuate both of the mechanisms which need to be actuated to provide adjustment, but these older adjustment mechanisms are generally very complex and therefore expensive, and the risks for damages and malfunctions are increased.

THE PURPOSE AND MOST ESSENTIAL FEATURES OF THE INVENTION

The object of the invention is to provide an adjustable steering wheel column for vehicles provided with means for adjustment of its length and means for adjustment of its inclination relative to the vehicle body wherein the steering wheel column comprises a steering wheel column housing, a first steering column tube displaceably arranged in said housing and a second steering column tube, pivotably arranged relative to said steering wheel column housing, said first and second steering column tubes being interconnected by said intermediate steering wheel column housing, the said second steering column tube at its end cooperating with the steering wheel column housing being provided with a hub, which is mounted for limited rotation in a seat in the steering wheel shaft housing around a pivot axle located perpendicularly to the longitudinal direction of the tube and is to be locked from rotation in a number of angular positions by means of a locking mechanism, whereby the steering wheel axle and the steering axle are interconnected by an angularly adjustable coupling and extend through the said first and second steering column tubes and steering wheel column housing, and where a common control is provided for releasing or locking the length adjustment and tilting movement of the steering wheel shaft resp., and which has a simple and uncomplicated design.

This has been achieved by the device being given the features defined in the characterizing part of claim 1.

DESCRIPTION OF THE DRAWINGS

The invention will in the following be further described with reference to embodiments shown in the accompanying drawings.

DETAILED DESCRIPTION OF THE PREFERRED EMBODIMENTS

Figure 1:
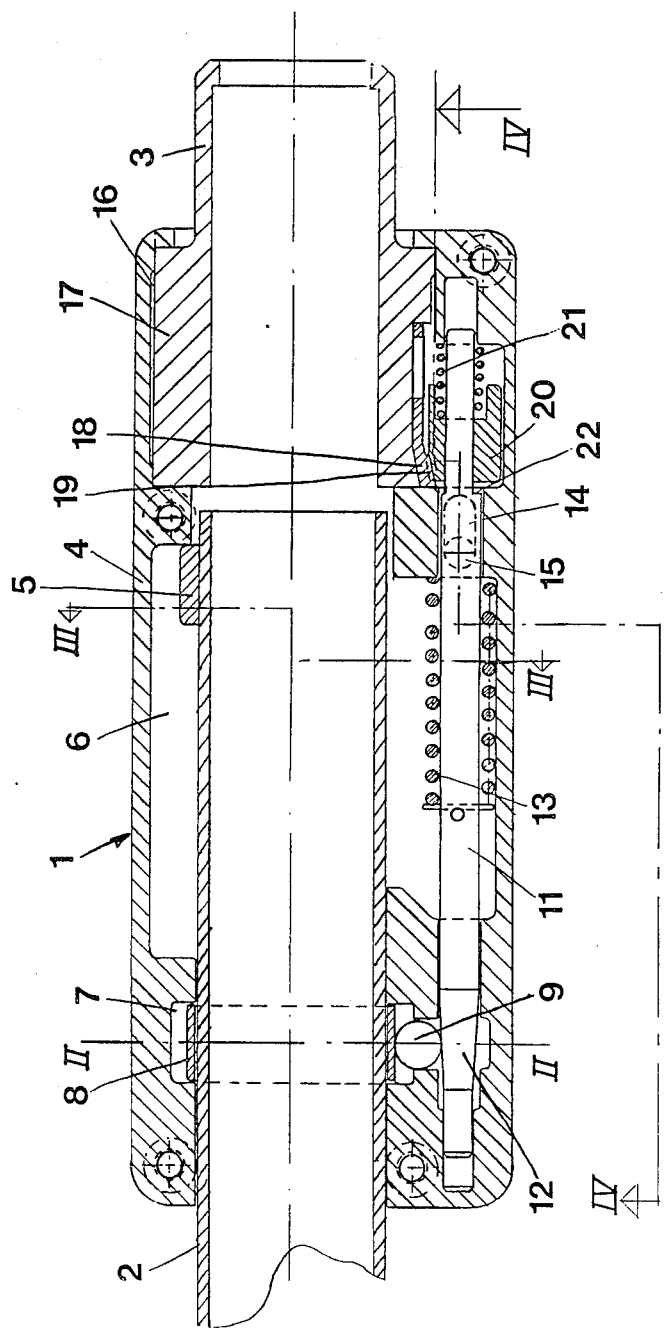
FIG. 1 is a longitudinal sectional view of a part of a steering wheel column according to the invention.

FIGS. 1-4 illustrate different sectional views through a steering wheel column 1 according to the present invention, which comprises a first steering column tube 2, a second tiltable steering column tube 3 and a steering wheel column housing 4 interconnecting the two steering column tubes. A steering wheel axle provided with a steering wheel and a steering axle cooperating with a steering mechanism interconnected by an angularly moveable connection, and rotatably housed in the two steering column tubes and the steering column housing, but these members are not shown in the drawings for entailing these a better clarity, as they are machine members well known per se and of conventional type.

In the embodiment shown in FIGS. 1-6 the first steering column tube 2 is longitudinally displaceable in the housing 4 and this displacement is limited by a shoulder 5 provided adjacent the end of the steering column tube, and arranged to move in a longitudinal groove 6 in the housing. The axial movement of the first steering column tube in the housing, therefore will be limited to the distance between the two ends of the groove and rotation of the first steering column tube relative to the housing is furthermore prevented by cooperation between the shoulder 5 and the groove 6.

Figure 2:
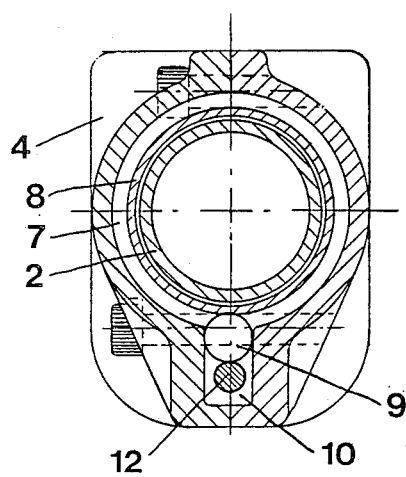
FIGS. 2-4 are cross-sectional views taken along lines II—II, III—III and IV—IV resp. of FIG. 1.
Figure 3:
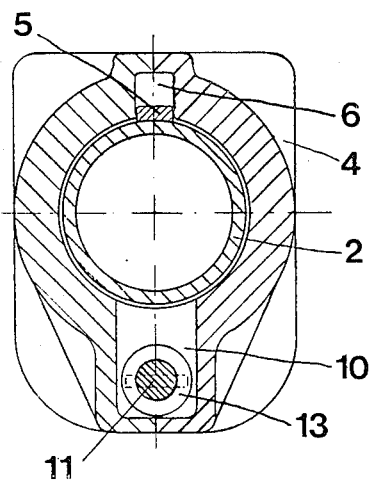

In this particular embodiment the steering wheel column housing 4—as can be best seen in FIGS. 2 and 3—is divided along an axial diametrical plane, and each half is equipped with a longitudinal semi-circular opening, which openings form a longitudinal seat for the first steering column tube 2, when they are joined together by means of screws or the like. Around this seat and adjacent one end of the housing there is provided a circumferential groove 7, in which is inserted a thrust ring 8, which with some play surrounds the first steering column tube. By means of an actuating member 9, which in the embodiment is a ball, the thrust ring 8 can be exposed to a force acting radially from outside and thereby is capable of displacing the thrust ring 8 to lock the first steering column tube from axial displacement in relation to the housing 4. This locking function is known from Swedish Pat. No. 8,203,018.

In an elongated groove 10, arranged in the housing 4 along the seat for the first steering column tube but spaced apart from the same, a piston 11 is displaceably supported, said piston in the embodiment shown having a tapered portion 12 provided adjacent one end. Said piston 11 is by means of a spring 13 biased to press said tapering portion 12 against the actuating member 9 of the thrust ring when the piston is not influenced by external forces, and thereby during displacement make the thrust ring 8 lock the first steering column tube 2 against axial displacement in relation to the housing. Although the piston is mounted for axial reciprocation in the housing, it is also contemplated that the piston could in an alternative embodiment be pivotally supported.

The piston 11 is provided with a recess 14 in which engages a control 15, which enables the piston to be displaced from the neutral position, against the effect of the spring 13, whereby the tapering portion 12 of the piston is displaced thus that the actuating member of the thrust ring—the ball 9—during contact with the inclined surface of the taper, will be removed from the thrust ring 8, whereby said ring can be selfcentered around the first steering column tube 2, and thereby permit the displacement thereof in the housing. When the control is again relieved the spring 13 will return the piston to a position wherein the tapering portion 12 will press the ball 9 against the thrust ring 8, which will result in a locking of the motion of the first steering column tube.

Figure 4:
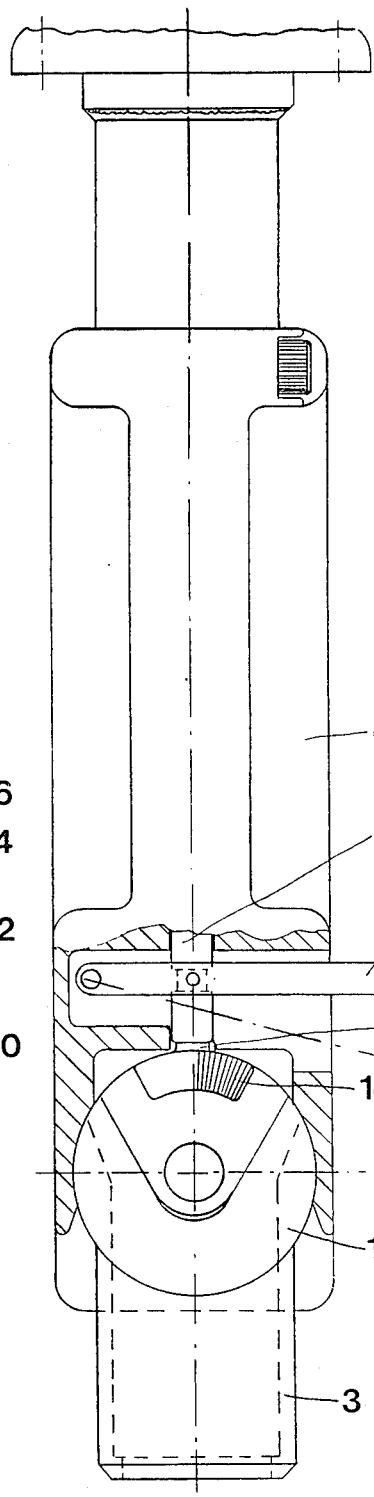

At the opposite end of the steering wheel column housing 4 of the present embodiment there is tiltably mounted a second steering column tube 3, forming part of the steering wheel shaft. For this purpose the housing is equipped with an internal cylindrical seat 16 having its center axis arranged perpendicularly to the longitudinal axis of the housing. The second steering column tube 5 at its end cooperating with the steering wheel shaft housing is provided with a hub 17 corresponding to the seat 16, which hub is pivotable in the seat. As shown in FIGS. 1 and 4, a toothed segment 18 is provided on the hub, which toothed segment cooperates with a body 20 equipped with at least one catch 19, which body displays a through-hole and is moveably mounted on said piston 11. The body 20 is by a spring 21 biased against a position where the catch 19 and the toothed segment 18 engage into each other and thereby prevent rotation of the hub 17 in the seat 16. Upon any displacement of the piston 11 by means of the control 15, a shoulder 22 on the piston will press onto the body 20 and thereby displace the body against the action of the spring 21, whereby the catch 19 is brought out of engagement with the toothed segment 18 and thereby permits tilting of said second steering column tube in relation to the main direction of the steering wheel column.

As there in this embodiment is a small amount of play between the shoulder 22 of the piston and the body 20 in the neutral position of the piston, in the example shown a displacement of the piston by means of the control will result in that the thrust ring 8 first will release the locking engagement with the first steering column tube, and at a further short displacement the adjustment of the second steering column tube will be released. If the play is eliminated both displacement will be released at the same time.

Figure 5:
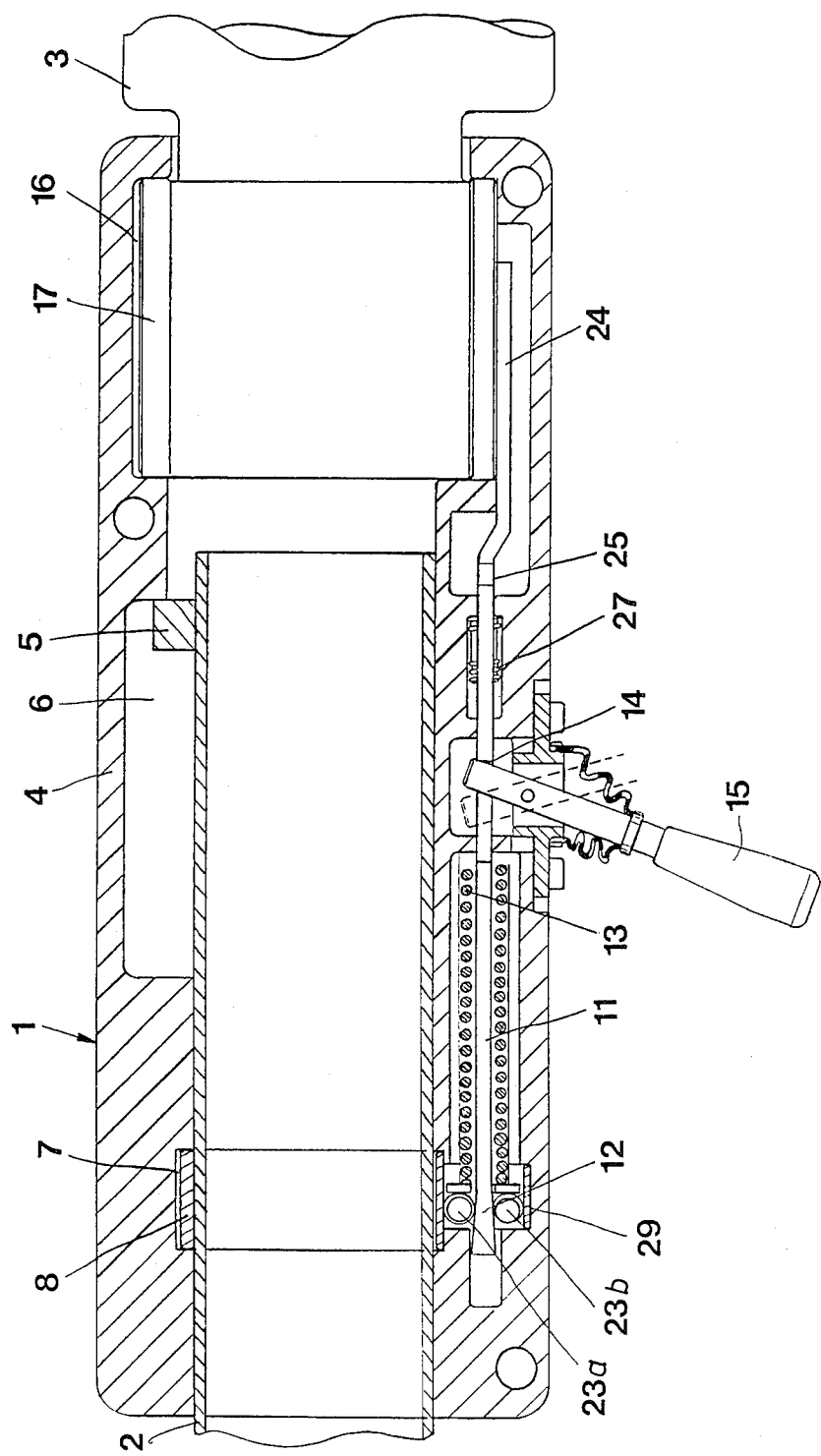
FIG. 5 is a longitudinal sectional view corresponding to FIG. 1 and showing another embodiment of a steering wheel column according to the invention.
Figure 6:
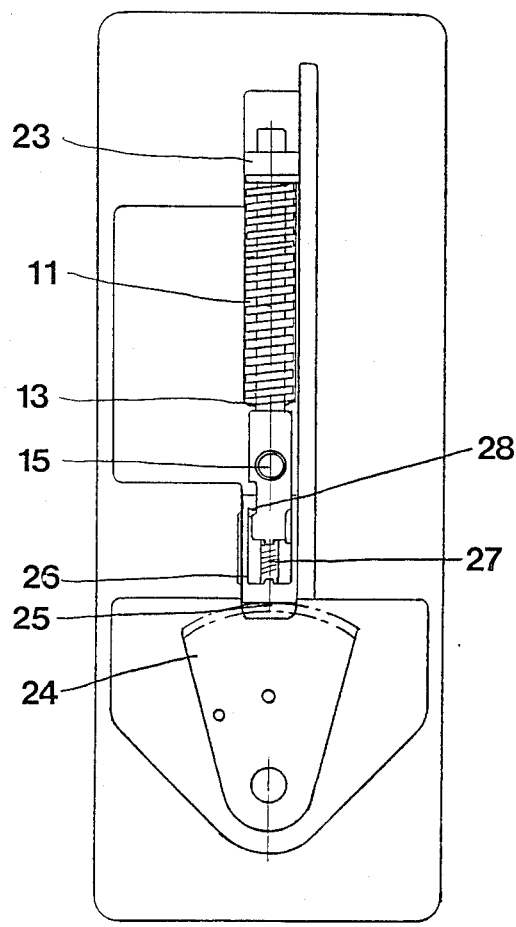
FIG. 6 is a view in reduced scale of the steering wheel column housing of the steering wheel column according to FIG. 5 as seen in a section along line VI—VI.

FIGS. 5 and 6 show, in a view corresponding to FIG. 1 and a view from beneath mainly corresponding to FIG. 4 resp., a modified embodiment of a steering wheel shaft 1 according to the invention. Details having full correspondence in corresponding details in FIGS. 1–4 are given the same references as these.

This steering wheel column 1 thus includes a first steering column tube 2, a second steering column tube 3, a steering wheel shaft housing 4 with an internal seat for the first steering column tube, a groove 6 in which a shoulder 5 provided on the first steering column tube is restrictedly moveable. The axial motion of the first steering column tube in the housing can be locked by means of a thrust ring 8 loosely arranged in a groove 7 in the housing, whereby actuating members press against the thrust ring in a manner to displace said ring. The thrust ring 8 has an inner diameter that is somewhat greater than the outer diameter of the first steering column member 2. The actuating members 23 in this case are formed by two cylindric rollers 23a, 23b, which in a seat are located one on each side of a tapering portion 12 on a piston 11 displaceably arranged in a groove in the housing, which piston is biased against a position where the tapering portion 12 is located thus that a first one 23a of the rolling bodies is pressed against the thrust ring and displaces the same, whereas the second rolling body 23b acts as a holder-on for the tapering portion in the seat. The seat is provided with a low friction material 29, against which said second rolling body 23b makes a short rolling movement at the displacement of the piston, whereby the starting friction at the beginning of the release movement is minimized, at the same time as the strength is increased.

The axial displacement of the piston 11 is effected by a control 15 engaging into a recess 14 in the piston. At the opposite end of the housing 4 there is arranged a cylindrical seat 16 having its center axis arranged perpendicularly to the longitudinal direction of the steering wheel shaft. In this seat 16 is pivotably arranged a hub 17 located at the end of the second steering column tube 3, which hub in one side surface is provided with a toothed segment 24, which in this case projects from the hub and extends into a space where it cooperates with the catch formed by a catch lever 25 attached to a displaceable body 26, which is biased by a spring 27, thus that it uninfluenced by external forces holds the toothed segment 24 and the catch lever in interengagement thereby preventing the segment from pivoting.

The body 26 is equipped with a stop 28 arranged to cooperate with the end of the piston 11 facing away from the tapering portion 12, whereby there is a play between said stop 28 and the piston 11, which means that a first part of the piston movement causes that the longitudinal adjustment of the first steering column tube adjustment relative to the steering wheel column housing is made possible, whereas further displacement of the piston gives a possibility of tilting the second steering column tube relative to the steering wheel shaft housing. In this case the piston can be considered to consist of a two-part piston comprising the proper piston part 11 and the body 26.

Figure 7:
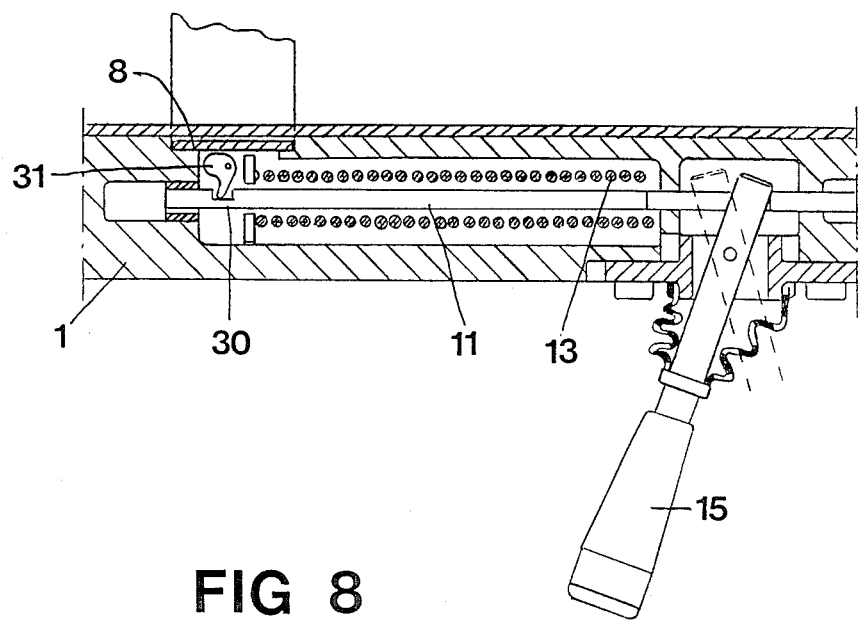
FIG. 7 is a detail view of a steering wheel column according to the invention with a partly modifed design.

In FIG. 7 is shown a part of the piston 11 in enlarged scale and the actuating part for the thrust ring 8 is in this case designed as a recess 30 in the piston, which recess cooperates with an eccentrically supported body 31, which thus can replace the rolling elements in earlier illustrated embodiments.

Figure 8:
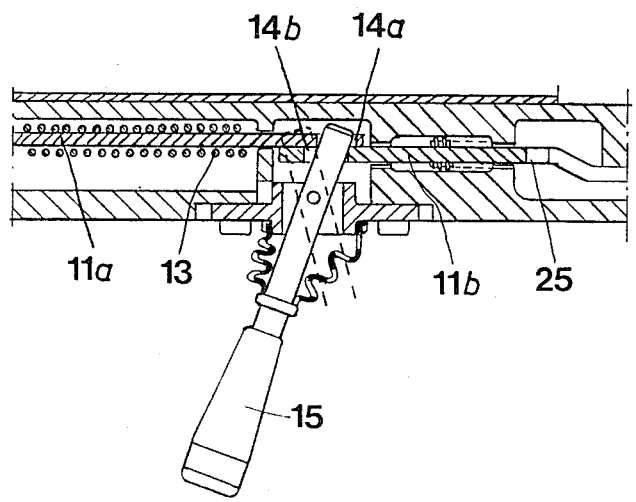
FIG. 8 is another detail view of a further modification of a steering wheel column according to the invention.

In FIG. 8 is illustrated how the piston can be divided in two piston parts 11a, 11b arranged in parallell positions, each serving one of the locking functions and each having an opening 14a and 14b resp. for the control 15. By giving each of these openings a play which are disposed on different sides of the working point of the control in its neutral position, is it easy to achieve an arbitrary displacement between the different releasing functions.

The invention is not limited to the accompanying drawings and the embodiments described in connection thereto, but modifications are possible within the scope of the following claims.

The steering column tubes shown in the examples can freely be turned so that either the first steering column tube, which is axially adjustable in relation to the housing, encloses the steering wheel shaft, which extends rotatably therethrough and cooperates with a not shown steering mechanism, whereas the second steering column tube, which is tiltable, encloses the rotatable steering axle with a steering wheel mounted thereon. The opposite condition is also possible, i.e. where the axially adjustable steering column tube is turned towards the steering wheel and the tiltable steering column tube is turned towards the steering mechanism.

If there is a desire that the tilting movement is released before the longitudinal adjustment, this can be provided by allowing the actuating members 9,23 cooperate, e.g. with a straight part of the piston 11 before they come in contact with the tapering portion, whereas the play between the body 8 and the stop 29 is eliminated. It is also possible, in a corresponding manner, to arrange that both adjustment movements are released at the same time.

By moving the play within the area for the control cooperation with the piston and its cooperating parts, it is easily possible to bring about the release of the different locking functions in reversed order.

The control has consistently in the drawings been shown as a hand operated lever 15, but the control can as well be consituted by a pedal, which transmits the power to the piston via a wire, or the piston itself can be formed as a machine element, which under influence of another external power source performs its displacment. In such a case the piston may e.g. be constituted by a part of an electromagnet, which at switching over upon an electric switch can be caused to move sufficiently for making the releasing or locking movements.

In the drawings both the release and the locking functions have been demonstrated effected by axial displacement of the piston, but it is of course also possible, within the scope of the invention, to effect one or maybe both movements by rotating the piston.

What I claim is:

1. An adjustable steering wheel column for vehicles provided with means for adjustment of its length and means for adjustment of its inclination relative to the vehicle body, comprising a steering wheel column housing, a first steering column tube displaceably arranged in said housing; a second steering column tube, pivotably arranged relative to said steering wheel column housing; said first and second steering column tubes being interconnected by an intermediate steering wheel column housing, said second steering column tube at its end cooperating with the steering wheel column housing being provided with a hub, which is restrictedly rotatable in a seat in the steering wheel column housing around a pivot axle extending perpendicularly to the longitudinal direction of the second steering column tube and being adapted to be locked from rotation in a number of angular positions by means of a locking mechanism, whereby a steering wheel axle and the steering wheel column housing are interconnected by an angularly adjustable coupling, and where a common control is provided for releasing or locking the length adjustment and tilting movement of the steering wheel column responsive to said common control; wherein at least one piston is axially displaceable in the housing, said piston being biased to a position in which it exerts a force locking said first steering column tube against axial displacement and further actuates a blocking means for preventing the hub from rotating around its pivot axle, whereby the piston by actuation of said control is displaceable to a first position in which it permits either axial displacement between said first steering column tube and the housing and a second position wherein it additionally permits the blocking mechanism to release the hub, thereby making possible rotation of said second steering column tube in relation to the housing or further to a second position wherein said displacement is permitted, whereby two distinct, spaced apart release positions are obtained one for each one of said motions.

2. An adjustable steering wheel column as claimed in claim 1, where the axial displacement of said first steering column tube in relation to the housing is lockable by means of a thrust ring arranged in an annular groove in the housing, and having a somewhat bigger inner diameter than the outer diameter of said first steering column tube, and which by radial actuation by a means, acting against the outer side of the thrust ring can be displaced in order to lock said first steering column tube from axial displacement, wherein said piston is provided with at least one actuation portion adapted to cooperate with actuation means for the thrust ring, in order to alter the force exerted by the actuation means upon the thrust ring at displacement of the piston from neutral position, in which said piston is not influenced by the control.

3. A steering wheel column as claimed in claim 2, wherein the actuation means for the thrust ring is formed by at least one rolling body which is moveable in a seat and arranged to rest upon the actuation portion of the piston and simultaneously to engage the thrust ring.

4. A steering wheel column as claimed in claim 3, wherein the actuation means incorporate at least two rolling bodies, at least one of which engages a surface portion of low friction in the seat.

5. A steering wheel column as claimed in claim 2, wherein the actuation means for the thrust ring is formed by at least one pivotally supported eccentric body arranged to be actuated by the actuation portion of the piston and to engage against the thrust ring with a varying force in dependence of the instantaneous piston position.

6. A steering wheel column as claimed in claim 1, wherein the hub is provided with a toothed segment arranged to form a part of said blocking mechanism, while the other part of the mechanism is formed by a body cooperating with the piston and being provided with a catch, said body being slideably arranged in a seat in the housing and being biased towards a position in which the catch engages in said toothed segment thereby preventing the hub from rotating.

7. A steering wheel column as claimed in claim 6, wherein the piston, at its end provided with the body with the catch has a shoulder spaced apart from the body or the piston resp. when the piston is uninfluenced by external forces, and arranged at a first part of the displacement of the piston to be displaced to engagement against the body or against the piston resp. and at further displacement of the piston to displace the body against its biasing force to a postion releasing the hub.

8. A steering wheel column as claimed in claim 1, wherein the first steering column tube is displaceably arranged in the steering wheel column housing between end positions determined by a shoulder fitted to said first steering column tube and moveable in a groove in the steering wheel column housing between stops, which shoulder and groove also prevents rotational movement between said first steering column tube and the column housing.

9. A steering wheel column as claimed in any of claims 1–7, wherein the piston is divided into at least two parts arranged in a groove one after the other with a mutual axial play.

10. A steering wheel column as claimed in claim 7, wherein the piston is divided into two piston parts moveable in parallel positions, the actuation motions of the control being transmitted to said piston parts via points of action having different play.

* * * * *